United States Patent [19]

Greene

[11] 4,127,104
[45] Nov. 28, 1978

[54] SOLAR HEATER FOR WATER AND THE LIKE

[75] Inventor: Michael E. Greene, Birmingham, Ala.

[73] Assignee: Solar Works, Inc., Birmingham, Ala.

[21] Appl. No.: 795,398

[22] Filed: May 9, 1977

[51] Int. Cl.² ............................................. F24J 3/02
[52] U.S. Cl. ...................................... 126/271; 126/400
[58] Field of Search ..................... 126/270, 271, 400; 237/1 A; 165/106

[56] References Cited

U.S. PATENT DOCUMENTS

| 3,946,944 | 3/1976 | Keyes et al. | 126/270 |
| 3,987,782 | 10/1976 | Meier, Jr. | 126/271 |
| 4,003,367 | 1/1977 | Wikholm | 126/271 |

Primary Examiner—Kenneth W. Sprague
Assistant Examiner—James C. Yeung
Attorney, Agent, or Firm—Hugh P. Carter

[57] ABSTRACT

An improved, portable, inexpensive solar heater for water and similar liquids. The heater comprises a tank triangular in transverse cross section, the hypotenuse of the triangular shape being closed by a wall effective to pass solar heat energy into the contents of the tank. A pivoted cover is provided for the hypotenuse wall and the inner surface of the cover is reflective, thus to augment the heat received by the contents of the tank. Preferably the tank and cover are made of shells filled with heat insulating material.

2 Claims, 7 Drawing Figures

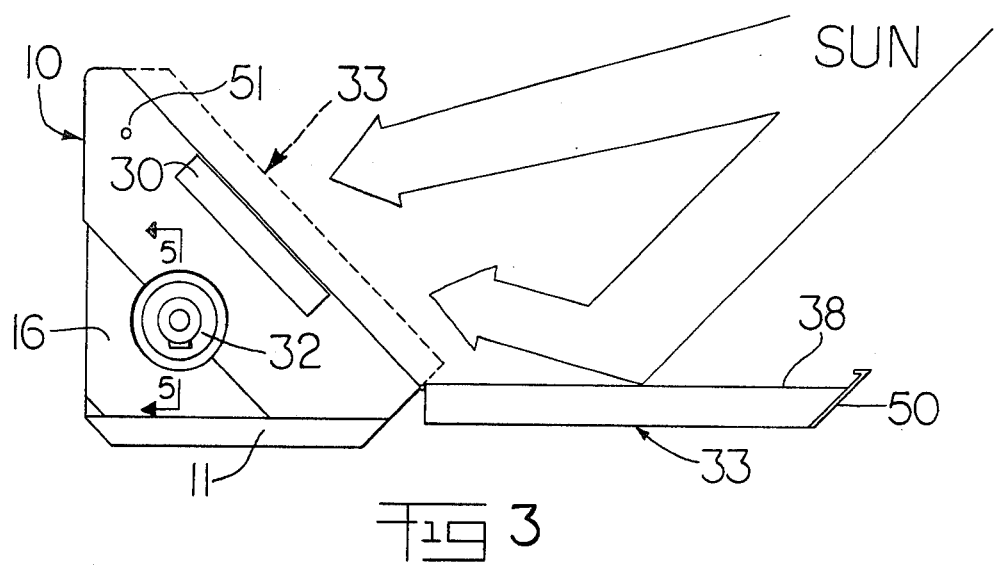
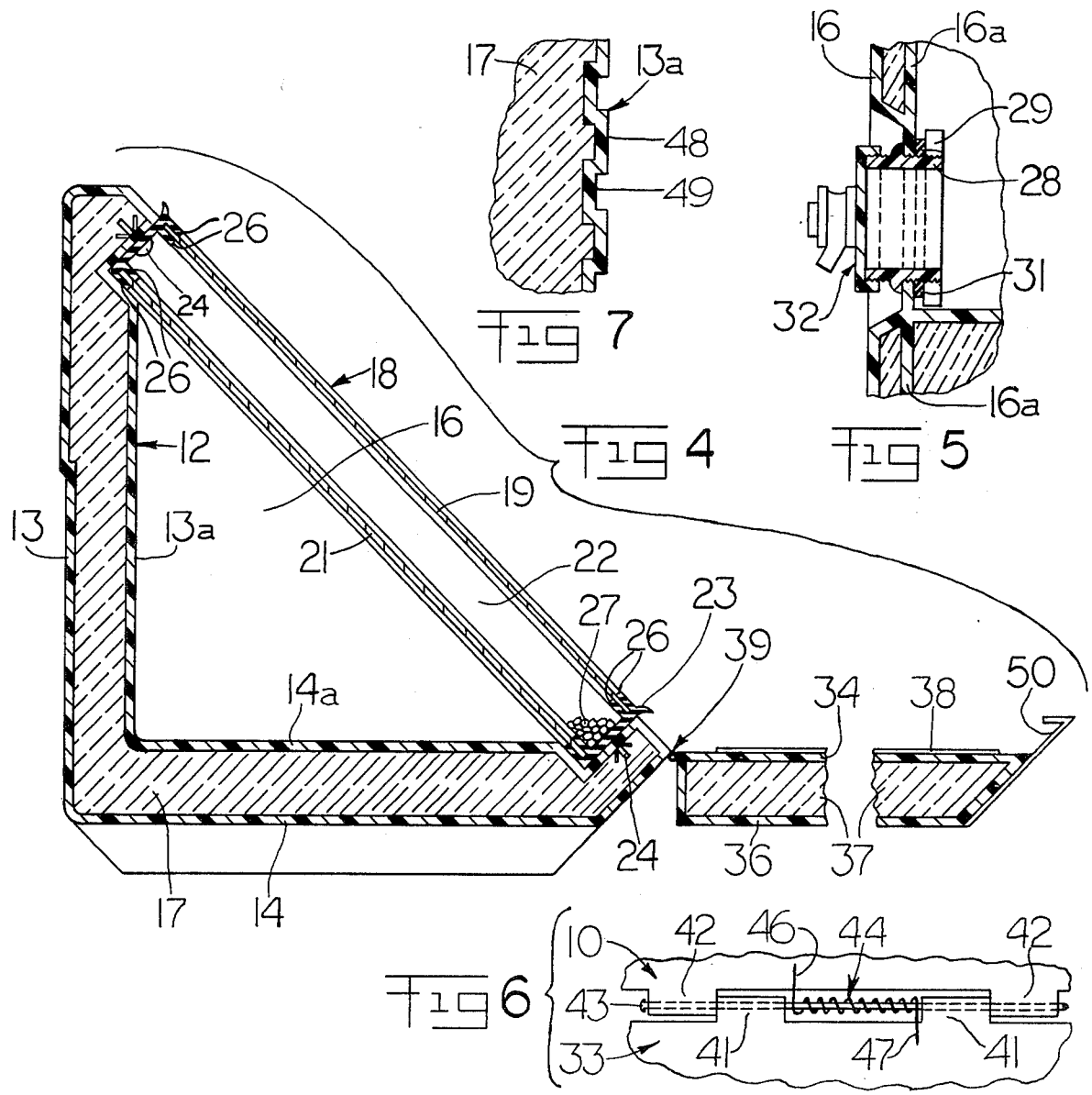

SOLAR HEATER FOR WATER AND THE LIKE

This invention relates to solar water heaters and has for one of its objects the provision of an economical, effective, lightweight and portable heater which may be used by sportsmen, outdoor enthusiasts and the like.

Another object of my invention is to provide a solar heater for liquids such as water which comprises a tank, generally triangular in transverse cross section, the tank being completed by the provision of a hypotenuse wall formed of material which will pass solar heat energy into the contents of the tank.

Another object is to augment the heating effectiveness of the tank by the provision of a pivoted cover associated with the hypotenuse wall, the inner surface of the cover being highly reflective and being adjustable, anglewise, relative to the hypotenuse wall so that when properly positioned with the hypotenuse wall facting the sun additional energy is reflected onto the hypotenuse wall from the reflective surface of the cover.

A further object is to provide a cover of the character designated which also is formed of heat insulating material whereby when closed against the hypotenuse wall the heat is more efficiently retained in the contents of the tank.

A solar heater illustrating features of my invention is shown in the accompanying drawings forming a part of this application in which:

FIG. 3 is a side elevational view with the parts in heating position;

FIG. 4 is an enlarged, detail sectional view taken generally along line 4—4 of FIG. 2, the walls of the shells of the tank and cover being exaggerated in thickness;

FIG. 5 is an enlarged fragmental detail sectional view taken generally along line 5—5 of FIG. 3;

FIG. 6 is an enlarged fragmental view illustrating the spring counter-balances for the cover, the view showing the cover in closed position; and, FIG. 7 is an enlarged, fragmental detail sectional view illustrating the method of increasing the surface area of the inner walls of the tank.

Figure 1:
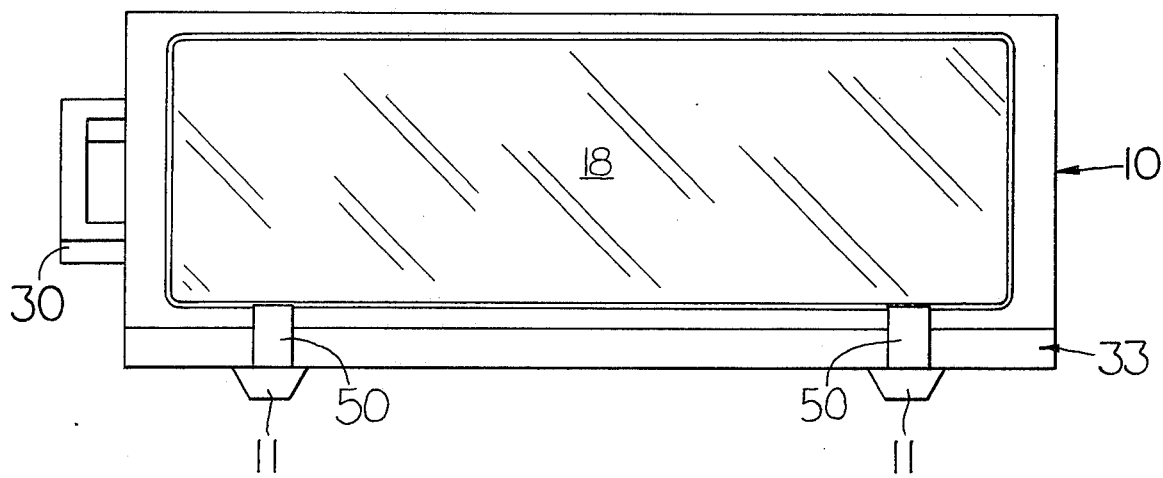
FIG. 1 is a front view of my improved heater with the same in open, water heating position.
Figure 2:
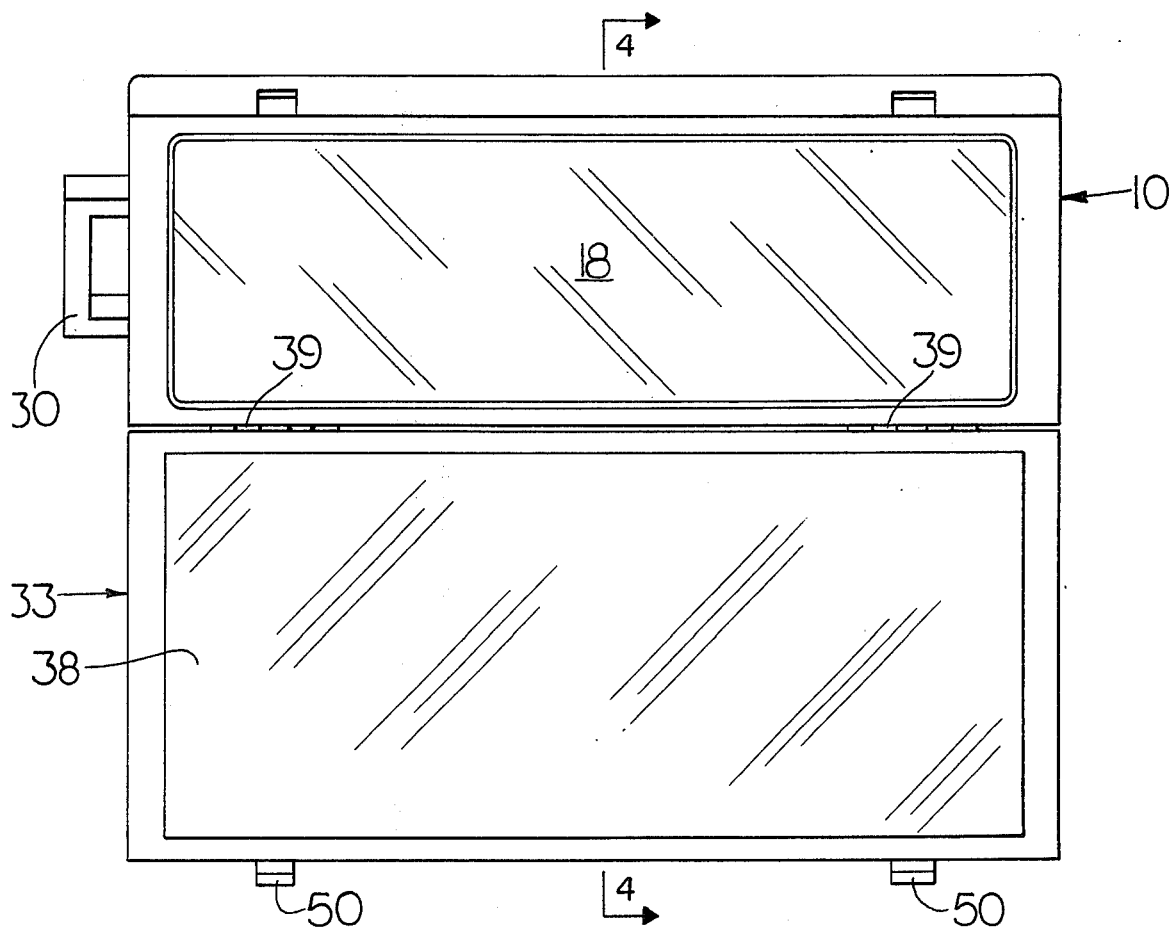
FIG. 2 is a plan view with the parts in heating position.

Referring now to the drawings for a better understanding of my invention, I show in FIG. 1 a tank indicated generally by the numeral 10 and which for convenience may have legs 11 for resting on the ground.

As best shown in FIG. 4 the tank 10 may be formed of a hollow shell member indicated generally by the numeral 12. That is to say, the shell may be formed by a process such as blow molding thus to provide a tank having an outer vertical wall 13, a corresponding inner vertical wall 13$^a$, an outer bottom wall 14 and a corresponding inner wall 14$^a$. It will be understood that the end walls 16 and 16$^a$ also are integrally formed with the walls 13-13$^a$ and 14-14$^a$. From the drawings it will be seen that my improved tank is triangular as viewed in transverse section. Preferably, the walls of the tank all are filled with heat insulation material 17, such as in situ foamed material preferably one of the urethane foams.

The hypotenuse of the triangular shaped tank body is closed by means of a hypotenuse wall indicated generally by the numeral 18. The wall 18 is formed of spaced apart sheets of material 19 and 21, thus providing between them an airspace 22.

The walls 19 and 21 may be made water-tight to the walls by the provision of an extrusion 23 which is held in place around the entire open side of the tank by means of a plurality of rivets or the like 24. The sheets of material 19 and 21 are engaged between lips 26 formed integrally with the strip 23 and made water-tight by suitable adhesive.

In order substantially to reduce condensation between the sheets of material 19 and 21 I may place in the space 22 a quantity of hygroscopic material such as silica gel shown at 27.

In one of the end walls 16 I provide means to supply water to the tank and to remove the same therefrom. Thus, I may use a bulkhead fitting 28 having a nut 29 for securing the same in an opening provided in the wall 16. Further, and as illustrated in FIG. 5 the wall 16 is reduced to a single thickness of material at the point where the fitting is inserted. A suitable gasket 31 is employed to make the connection fluid-tight.

A combination spigot and removable cap indicated at 32 may be screwed onto the outer end of the fitting 28. When it is desired to fill the tank cap 32 is removed, with the tank standing on end. When the cap is in place and the tank is resting on its legs water may be withdrawn by pressing the usual button on the spigot portion.

On the spigot end of the tank I provide a handle 30. The handle may be formed integrally with the shell 12.

In order to augment the heat absorption of the contents in the tank and also to provide insulation for the wall 18 to maintain the contents of the tank hot, I provide a cover indicated generally by the numeral 33. Again, the cover 33 preferably is formed as a hollow, blow molded shell, having an inner wall 34 and an outer wall 36, joined by suitable end walls as indicated. The shell 36 preferably is filled with a suitable in situ foamed material such as urethane foam indicated at 37.

The cover is provided on its inner surface 34 with a sheet of mirrored surface material shown at 38. This material substantially covers the inner surface of the inner wall 34 as indicated in the drawings.

The cover 33 is hinged at 39 to the front, lower wall of the tank 10. As best shown in the detail, FIG. 6, I provide on the cover 33 spaced extensions 41. Similarly, on the tank 10 I provide extensions 42, spaced apart. Passing through these extensions which in effect form hinge butts is a pintle 43. In the space indicated I surround the pintle with a spring 44 having one end 46 hooked under the adjacent wall of the tank and the other end 47 in contact with the end wall of the cover. There may be two or more of these hinge and spring assemblies. The purpose of these springs is substantially to counterbalance the weight of the cover so that it may be adjusted, anglewise, relative to the hypotenuse wall 18, thus to reflect solar heat energy onto the wall 18 to improve the efficiency of the unit.

It is desirable that the walls 13$^a$, 14$^a$, and the inner surfaces 16$^a$ of the end walls have their surface area increased. That is to say, in order to increase the heat absorption properties of these walls I preferably form them as shown in FIG. 7. The walls just mentioned are formed by a sort of embossing, namely, in which the entire surfaces of said walls are made up of a multiplicity of areas 48 which lie outwardly from the median thickness line of the wall and another multiplicity of areas 49 which line inwardly of said median thickness line. In this way the walls 13ª, 14ª and 16ª absorb more of the sun's energy and impart the same more rapidly to the water in contact with them.

While my invention may be fabricated in various ways, and from various materials, nevertheless I prefer to make the shell of the tank 10 of high density polyethylene. The average wall thickness of the walls forming the shell of the tank 10 are on the order of 70/1000ths of an inch. The sheets 19 and 21 preferably are of material which can be bought on the open market from the Kalwell Corporation of Manchester, New Hampshire and which is presently sold by that company under its trademark "SUN-LITE". While this precise formulation is not presently known to me, the material appears to be a form of fiberglass reinforced plastic. Regardless of its formulation or construction, I have found it to be an excellent material for transmitting solar energy into water or the like in the tank 10.

In similar manner the cover 33 may be blow molded as an integral, hollow body from materials such as high density polyethylene. Unlike the shell forming the tank 10 to which carbon black has been added, I preferably use white material for the wall 34 and in fact, for the entire shell 33. Concerning the material 38, I have found that a sheet of aluminumized polyester material about one mill thick which can be purchased on the open market with a pressure sensitive back, is adequate. This sheet substantially covers the entire inner surface of the wall 34 as shown in the drawings.

From the foregoing it will be apparent that I have devised an improved solar water heater which is economical of manufacture and efficient in operation. In use the device simply is set upon the ground or other supporting surface with the hypotenuse wall 18 facing the sun. The cover 33 is now pivoted about its hinges to the angle which most efficiently reflects the rays of the sun onto the hypotenuse wall 18. The cover may be provided with snap type, spring clips 50 to hold the cover closed.

In actual practice I have found that a solar heater constructed in accordance with my invention and which has a capacity of approximately two gallons, on an average summer day in the Southeastern part of the United States will raise the temperature of said two gallons of water at a rate of approximately 40° F. per hour and, if continued long enough, will in fact boil the water. In view of the fact that the tank is water-tight, it is necessary to provide a vent hole into the interior of the tank as indicated at 51 in FIG. 3. Due to the method of fabricating the tank as herein disclosed I am enabled to provide a solar water heater of two gallon capacity which, if empty, weighs a mere six to seven pounds. My improved heater therefore is readily portable and may quite easily be carried by hunters, fishermen, campers and the like.

While I have shown my invention in but one form, it will be obvious to those skilled in the art that it is not so limited but is susceptible of various changes and modifications without departing from the spirit thereof.

What I claim is:
1. In a solar heater for water and the like,
   (a) a tank for the liquid to be heated which is generally triangular in transverse cross section and has end walls, the inner surfaces of the walls of the tank comprising material having heat absorbing properties and in which the surface area of the said inner walls is increased by forming thereon a multiplicity of alternately raised and sunken areas,
   (b) a wall forming the hypotenuse of the triangular shaped tank and constructed of spaced apart sheets of material providing an air space therebetween and effective to pass heat energy from the sun into the tank,
   (c) an insulated cover for the hypotenuse wall associated with said wall and movable from a position covering said wall to positions exposing said wall to sunlight,
   (d) the inner surface of said cover being energy reflecting, whereby energy from the sun striking said surface is reflected onto said hypotenuse wall, and
   (e) means to supply liquid to the tank and remove the same therefrom.
2. Apparatus as defined in claim 1 in which said cover is provided with means effective to hold the same at selected, heat reflecting angles relative to the hypotenuse wall.

* * * * *